J. MALONEY.
MILK-COOLER.

No. 190,604. Patented May 8, 1877.

Witnesses:
C. Clarence Poole
A. L. Youngs

Inventor:
John Maloney,
By J. B. Woodruff
Attorney

UNITED STATES PATENT OFFICE.

JOHN MALONEY, OF ONEONTA, NEW YORK.

IMPROVEMENT IN MILK-COOLERS.

Specification forming part of Letters Patent No. 190,604, dated May 8, 1877; application filed October 27, 1876.

*To all whom it may concern:*

Be it known that I, JOHN MALONEY, of Oneonta, in the county of Otsego and State of New York, have invented certain new and useful Improvements in Milk Pans and Coolers for Raising and Separating the Cream from the Milk for Dairy Purposes; and the following is a full, clear, and exact description of the same, reference being had to the accompanying drawings, making a part of this specification, in which—

Figure 1:
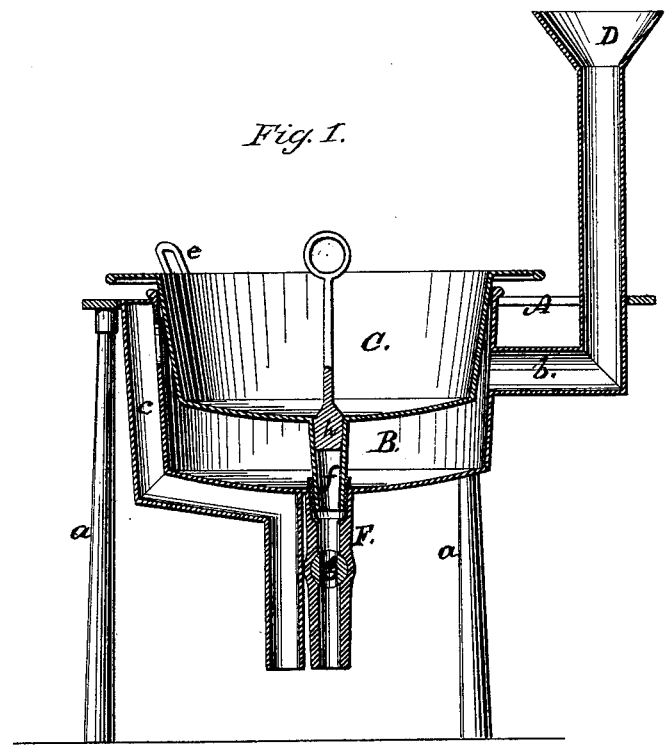
Figure 2:
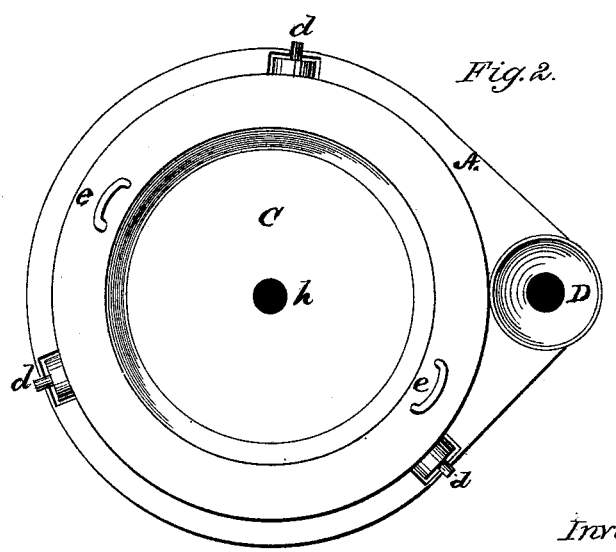

Figure 1 represents a side sectional elevation of the apparatus, showing the supporting-frame, the water or ice vessel, with its induction-pipe and overflow-pipe, the milk-pan supported on friction-rollers for rotating the same, and the central tube and plug for drawing out the milk. Fig. 2 shows a plan or top view of the same.

The object of my invention is to set the milk in very much larger quantities than is usually done in pans for raising the cream where cold spring water or ice is employed, to cause the separation to take place rapidly; and it consists in the construction, arrangement, and combination of the supporting-frame, the cooling-vessel, with its induction and eduction pipes, and the rotating milk-pan, with its supporting-rollers.

To enable others to make and use my invention I will describe it more in detail, referring to the drawings, and the letters marked thereon.

I make a circular frame, A, of any suitable material, and support it on standards $a$ $a$ at a convenient height. Into the circular opening of the frame A is fitted the water or ice vessel B, which is provided with an induction-pipe, $b$, to admit a stream of water flowing from a cold spring, and also on the opposite side an overflow or eduction pipe, $c$, so that when spring-water is used for cooling there will be a continuous flow around the sides and under the bottom of the milk-pan C; but if there is not spring-water for use the milk can be cooled by pouring in cold water drawn from a well into a funnel, D, provided for the purpose, the space in the water-vessel B between the bottom of the milk-pan C and it being sufficient to place a quantity of broken ice, if desirable, instead of pouring in water, to effect the cooling and facilitate the raising of the cream.

The milk pan or vessel C is supported on three friction-rollers, $d$ $d$ $d$, placed in a triangle on the top of the supporting-frame A, and provided with ears or handles $e$ $e$ on the top, so that it can be easily rotated to change the position in the cooler vessel.

When large, and containing a large quantity of milk, the bottom of the milk pan or vessel is made a little concave, and provided with a central tube, $f$, which is fitted at its lower end into the tube or vertical pipe F secured on the under side of the cooler-vessel, which has a stop-cock, $g$, by which the water is held up in the cooler and drawn off when desired.

In the top of the central tube $f$ is fitted a valve or plug, $h$, for holding the milk in the pan C, and by the opening or removing of which, (the stop-cock $g$ being previously opened,) the milk is gradually drawn off from under the cream without in the least disturbing or breaking the film, and leaving it free from the more fluid milk, by which means a larger quantity and a better quality of butter is produced, with much less labor in churning.

It has hitherto been the practice in large dairies to divide up the milk and set it in shallow pans; but practical experiment has demonstrated the fact that more butter can be made from a given quantity of milk when set for raising the cream in a large quantity, and a much better quality of cheese made from the milk from which the cream has been taken, by drawing off the milk than by the old process of skimming off the surface.

I do not claim a milk-cooler provided with an induction and overflow pipe. Neither do I claim, broadly, the drawing off of the milk from under and leaving the cream; but What I do claim is—

1. The combination of the tube F with its stop-cock $g$ secured to the cooler B, and the tube $f$ with its stopper $h$, the same fitting the pipe F, so that both the water and the milk may be discharged separately through the same tube, substantially as herein shown and described.

2. The vessel C seated in the vessel B, and adapted to revolve by means of rollers upon the frame A, as and for the purposes described.

In testimony whereof I hereunto subscribe my name to the above specification for improvement in milk pans and coolers.

JOHN MALONEY.

Witnesses:
 E. W. BENNETT,
 A. G. SHAW.